No. 609,894. Patented Aug. 30, 1898.
I. Z. MERRIAM.
WHEELED VEHICLE.
(Application filed Jan. 22, 1897.)
(No Model.)
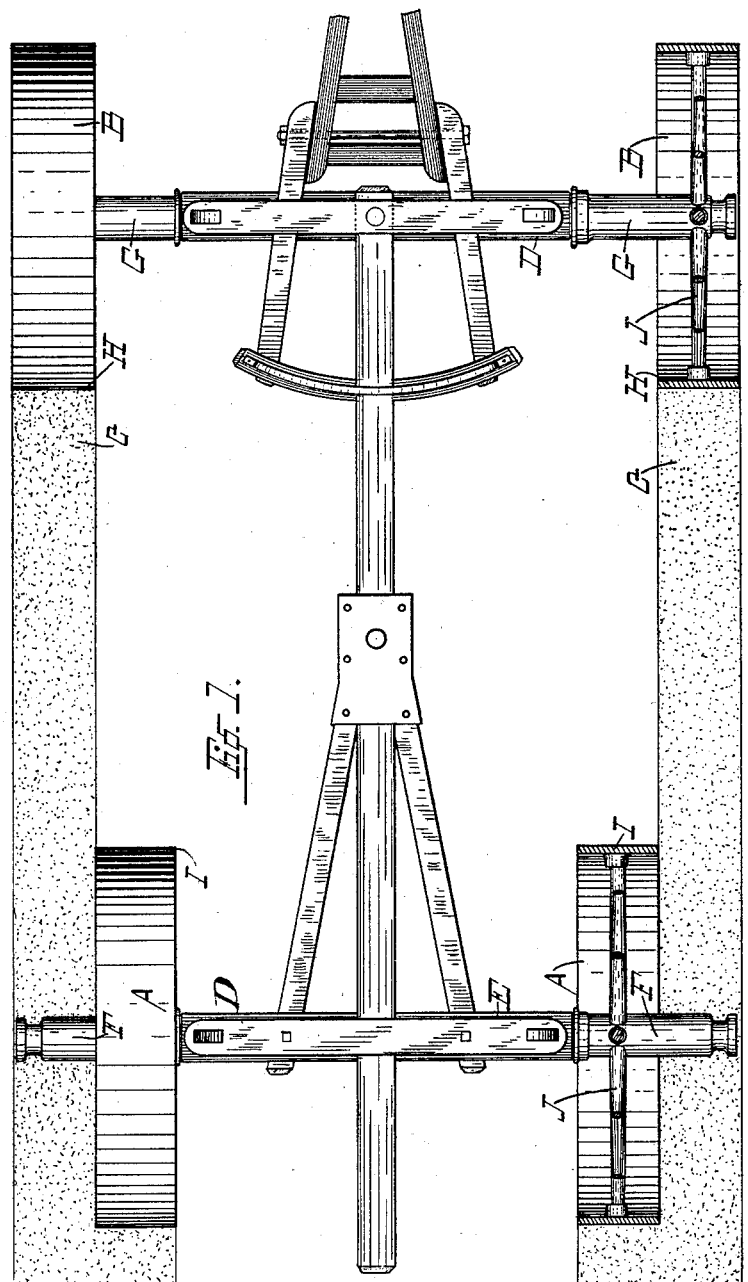

UNITED STATES PATENT OFFICE.

IRAM Z. MERRIAM, OF WHITEWATER, WISCONSIN.

WHEELED VEHICLE.

SPECIFICATION forming part of Letters Patent No. 609,894, dated August 30, 1898.

Application filed January 22, 1897. Serial No. 620,210. (No model.)

*To all whom it may concern:*

Be it known that I, IRAM Z. MERRIAM, a citizen of the United States, residing at Whitewater, in the county of Walworth and State of Wisconsin, have invented new and useful Improvements in Wheeled Vehicles, of which the following is a specification.

My invention relates to improvements in heavy wagons or other wheeled vehicles, and it pertains more especially to the novel construction and relative arrangement of the tires or rims of the wheels to each other and their respective hubs, whereby when in use the rims are brought to bear upon and smooth down a greater area of the road-surface than wagons of ordinary construction, the object of my invention being to aid in producing and maintaining good roads.

The construction of my invention is further explained by reference to the accompanying drawing, which represents a top view of the running-gear of my improved wagon, part in section.

Like parts in the several wheels are referred to by the same reference-letters.

The tongue, the axle, the reach, and other draft appliances of the wagon are of the ordinary construction.

To accomplish the desired object mentioned, the several rims of the wheels A A and B B are made wider than the ordinary, so as to better support the wagon upon the surface of sandy or soft roads and prevent the wheels from cutting and forming ruts in the surface, while they also serve the purpose of smoothing-rollers, by which all unevenness of the surface is pressed down to a common level, while the weight upon the wheels tends to pack and harden the surface, and thus improve instead of injure the condition of the road. To cause the rims to act upon a larger area of surface, the two rear wheels A A are so formed as to bring their rims just within the traction-line of the two front wheels B B, as shown by the wheel-tracks C C indicated, whereby the surface smoothed will be just twice what it would otherwise be were the rims of the front and rear wheels arranged in line with each other.

The front and rear axles D D are preferably of the same length and of the ordinary construction, and the wheel-hubs F F and G G thereon are located in line with each other at equal distances from the center of the wagon, while the rims of the front wheels are located about one-half their width outside of the centers of their respective hubs, and the rims I I of the rear wheels are located about one-half their width inside of the centers of their respective hubs. The spokes J of the respective wheels are connected at their outer ends with the centers of the respective wheel-rims, while their inner ends are connected with their respective hubs in the ordinary manner in line with the centers of their respective rims. It will be observed that by thus locating the rims of the front wheels outside of the centers of their hubs they will be less liable to be brought in contact with the body of the vehicle in turning, while by locating the rims of the rear axle inside of the centers of the hubs, as shown, the road-surface traversed by the front and rear wheels taken together will, as stated, be twice that of one of said pair of wheels alone, whereby the area of the surface acted upon by the wheels will be proportionately increased.

Having thus described my invention, what I claim as new, and desire to secure by Letters Patent, is—

1. In a wheeled vehicle, the combination with the front and rear axles, of broad-rimmed wheels, the rims and spokes of one pair of wheels being secured to the respective hubs outside of the common center between the respective ends of such hubs, and the rims and spokes of the other pair of wheels secured to their respective hubs inside of the common center between their respective ends, whereby the hubs of the front and rear wheels on each side of the vehicle may be in alinement, but with the rims of such wheels in adjacent and slightly-overlapping vertical planes, substantially as described.

2. In a wheeled vehicle, the combination with the front and rear axles of broad-rimmed wheels, the rims and spokes of the front wheels being secured to the respective hubs outside of the common center between the respective ends of such hubs, while the rims and spokes of the rear wheels are secured to their respective hubs inside of the common center between their respective ends, substantially as and for the purpose specified.

In testimony whereof I affix my signature in the presence of two witnesses.

IRAM Z. MERRIAM.

Witnesses:
 I. U. WHEELER,
 E. F. THAYER.